March 20, 1951 LE ROY J. LEISHMAN 2,545,622
APPARATUS FOR MEASURING DEPTH BY STEREOSCOPIC VIEWS
Filed June 9, 1945 5 Sheets-Sheet 1

INVENTOR.
Le Roy J. Leishman

March 20, 1951  LE ROY J. LEISHMAN  2,545,622
APPARATUS FOR MEASURING DEPTH BY STEREOSCOPIC VIEWS Filed June 9, 1945  5 Sheets-Sheet 2

INVENTOR.
Le Roy J. Leishman

INVENTOR.
Le Roy J. Leishman

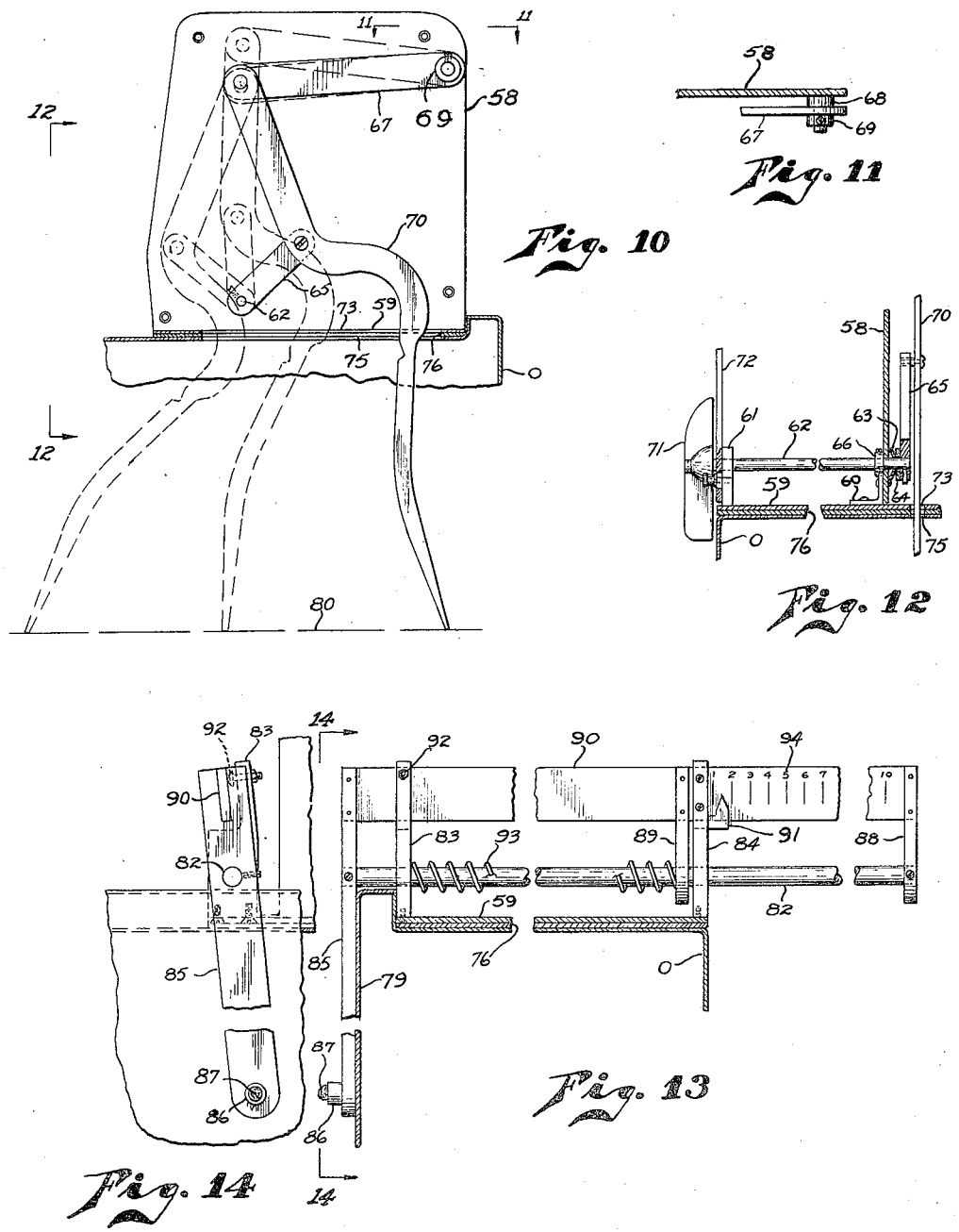

March 20, 1951 LE ROY J. LEISHMAN 2,545,622
APPARATUS FOR MEASURING DEPTH BY STEREOSCOPIC VIEWS
Filed June 9, 1945 5 Sheets-Sheet 5
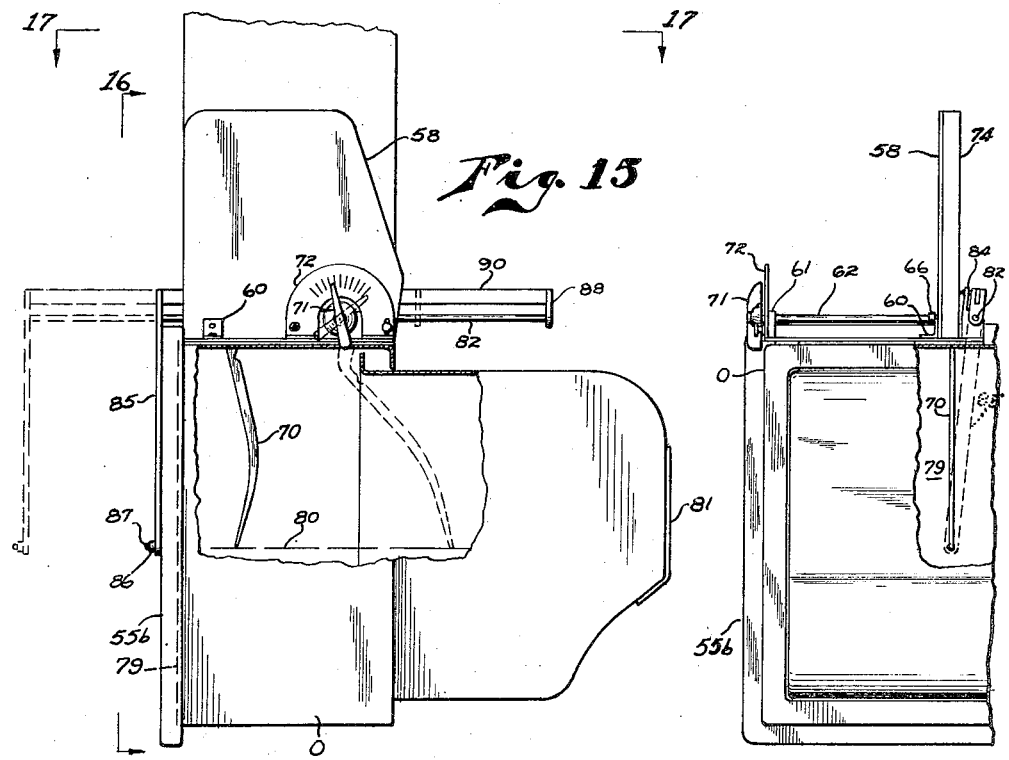
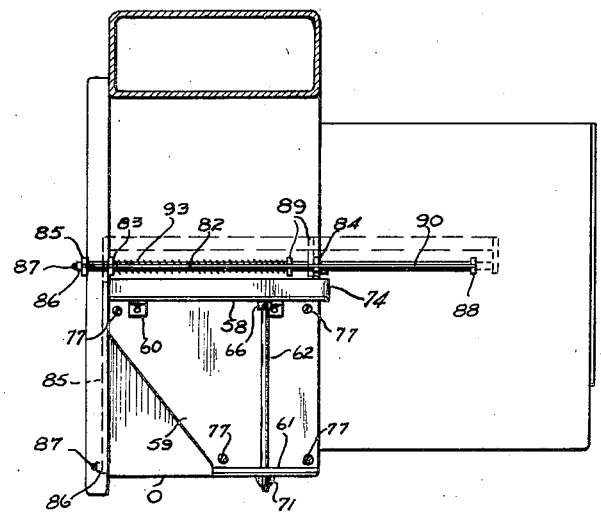
INVENTOR.
Le Roy J. Leishman Patented Mar. 20, 1951

2,545,622

UNITED STATES PATENT OFFICE 2,545,622

APPARATUS FOR MEASURING DEPTH BY STEREOSCOPIC VIEWS

Le Roy J. Leishman, Los Angeles, Calif.

Application June 9, 1945, Serial No. 598,447

3 Claims. (Cl. 250—60)

The invention herein described pertains generally to X-ray equipment, and more particularly to means for measuring depth in stereoscopic images.

One purpose of my invention is to provide means for measuring the distance of any object from a fluoroscopic screen or X-ray film by means of the X-ray shadows cast by the object.

In furtherance of this purpose, one object of my invention is to provide movable means that may be lined up visually with such shadows and to provide such means with indicia whereby the distance between the shadows may be read in terms of the distance of the object from the screen or film.

Another object is to provide an embodiment of my invention in which separate movable members may individually be aligned with such shadows and in which a suitable scale and indicator are provided for reading the shadow separation in terms of the distance of the object from the fluoroscopic screen or radiograph.

Another object is to provide means for casting movable shadows on a fluoroscopic screen or radiograph, which said shadows may be aligned with other shadows whose separation is to be used for determining depth.

Another object is to provide a single control apparatus for determining the distance of any object with respect to a reference plane by aligning movable means with representations of the object in stereoscopic images thereof.

Another object is to provide measuring means that may be moved through a stereoscopic or spatial image.

Another object is to provide such measuring means with a pointer that may be moved in a plane transverse to the plane of the film or screen on which the images appear that are rendered stereoscopic.

A further object is to provide means whereby the end of such pointer may be moved in a substantially straight line perpendicular to such screen or image-presenting surface.

A further object is to provide means, in conjunction with a device for marking a patient's skin over a foreign body, that will constrain the device to move in a line substantially coincident with the pointer of my depth-measuring device.

A further object is to provide connecting means between such pointer and a calibrated indicating device.

A further object is to remove substantially all play and lost motion between the means that are alignable with the shadows and the calibrated indicating devices in the various embodiments of my invention.

A further object is to make the various embodiments of my invention readily attachable and detachable with respect to the stereoscopic apparatus.

Still other objects will appear as the specification proceeds.

In the drawings:

Fig. 10 shows the linkage and lever movements of my preferred embodiment of my invention.

Fig. 11 is a view taken on line 11—11 of Fig. 10.

Fig. 12 is a view taken on line 12—12 of Fig. 10.

Fig. 13 shows the mechanism of the skin marker and skin-to-screen measuring device as applied to my depth measuring device.

Fig. 14 is a view taken on line 14—14 of Fig. 13.

Fig. 15 is a side view, partly broken away, of the preferred embodiment of my depth gauge mounted on the viewing hood of my stereoscopic fluoroscope.

Fig. 16 is a view taken of line 16—16 of Fig. 15.

Fig. 17 is a view taken on line 17—17 of Fig. 15.

When stereoscopic images are formed in front of a surface by the presentation to each of an observer's eyes of respectively different real images that lie on the said surface, the apparent depth positions of parts of the stereoscopic image vary with the separation on the said surface of the corresponding parts in the real images. The greater the separation in corresponding parts of the two real images, the further in front of the surface the parts appear to be in the stereoscopic image. If two shell fragments are visible in each of a pair of radiographs that have been made for stereoscopic purposes and disposed in the same plane, the fragment whose shadows are furthest apart will appear to be the furthest from the said plane in the stereoscopic view. The separation in such shadows can therefore be used for determining the depth of the objects casting the shadows. Heretofore, however, there has been no simple and accurate means for accomplishing this.

Figure 1:
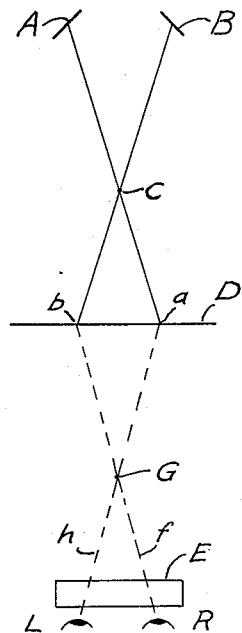
Fig. 1 is a diagram illustrating the formation of stereoscopic fluoroscopic images in front of a fluoroscopic screen.

As regards stereoscopic fluoroscopy, Fig. 1 illustrates the variation in the separation of shadows in accordance with the depth of the object casting such shadows. A and B represent two spaced sources of X-rays, such as targets of separate tubes, targets on separate anodes in the same tube, or spaced portions acting as targets on the same anode. C represents a point or small object in the path of the X-rays from sources A and B. The left tube A casts a shadow of point C at $a$ on the fluoroscopic screen D, while the right tube B casts a shadow of this same point at $b$ on the screen. When the stereoscopic image is to appear in front of the screen, the right eye R must see the shadow $b$ cast by the right tube B, and the left eye L must see the shadow $a$ cast by the left tube A. The stereoscopic image of C will appear at G where the visual rays $h$ and $f$ converge on their way from points $a$ and $b$ to the left and right eyes respectively.

Manifestly, each eye must see only the shadow intended for it, and means must therefore be provided for filtering or segregating the images for this purpose. It is immaterial to the present invention what specific means is employed to perform this function. Suitable means are illustrated and described in my Reissue Patent No. Re. 21,964, and my co-pending application Ser. No. 598,448 discloses an apertured drum that may also be used. A disc having spaced light-transmitting sections constitutes another alternative.

Inasmuch as the images produced by the two tubes are present on the screen successively, rather than concurrently, it is possible to cause means to come into operation at the proper intervals to polarize the light from these successive images in different planes, and to use analyzers in front of each eye to separate the light rays in accordance with their planes of polarization. One method of doing this is explained in the afore-mentioned re-issue patent.

If the stereoscopic pair of images happen to be radiographs rather than fluoroscopic images, they may be superimposed as in Vectographs or by means of emulsions having complementary colors. However, since no specific means is essential to the present invention, none is described in detail nor shown in the drawings, and these various alternatives are here mentioned only to shown the broad range of equivalents that may be employed for this purpose. In Fig. 1 and the other optical diagrams, the device E represents any means of this general class.

Figure 6:
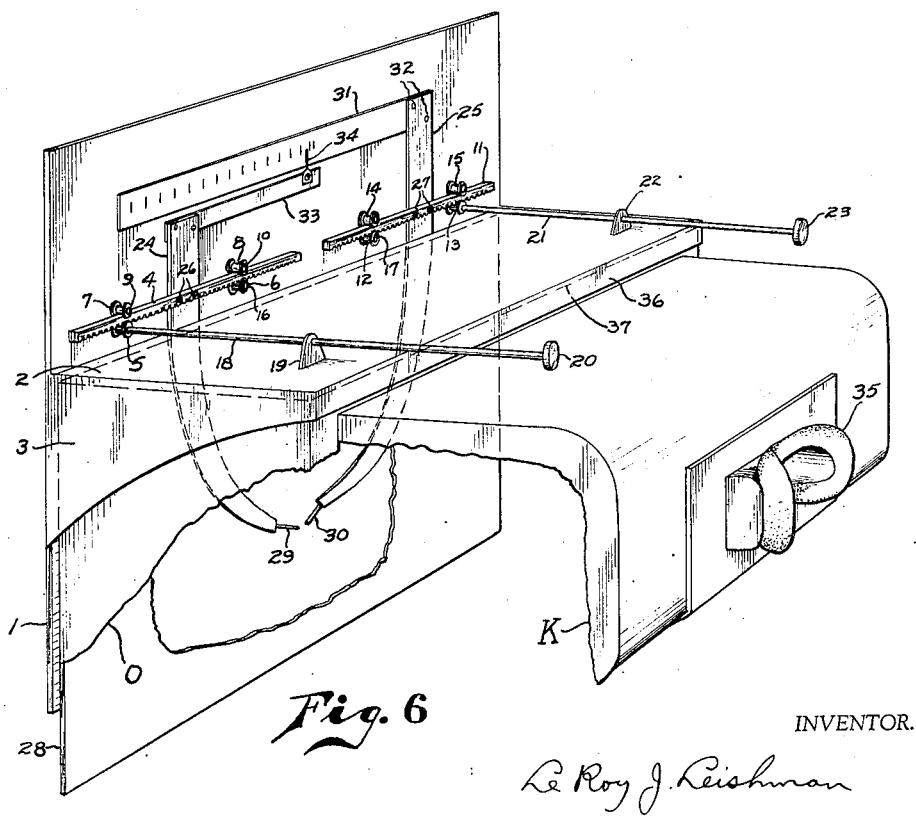
Fig. 6 is an isometric view, partly broken away, of one embodiment of my invention mounted on the viewing box of Fig. 5.

Fig. 6 shows one embodiment of my invention, the apparatus being shown in conjunction with the viewing hood of my stereoscopic fluoroscope, which said viewing hood has been broken away to show more clearly the apparatus and its manner of functioning.

Figure 5:
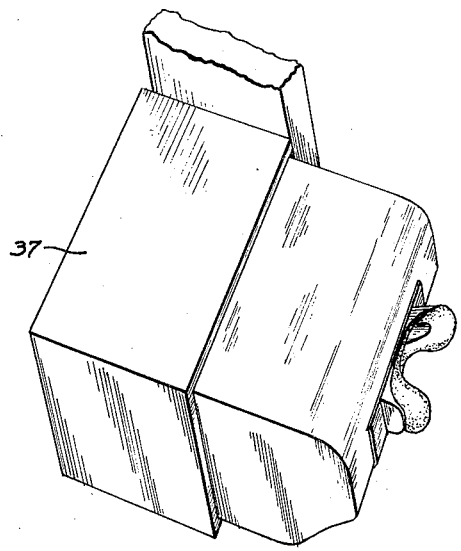
Fig. 5 is an isometric view of the viewing hood of my stereoscopic fluoroscope.

The apparatus shown in Fig. 6 is mounted on a frame comprising a main support 1, a flat plate 2 disposed at right angles to the support 1 and attached thereto, a side piece or brace 3, and a front strip 36 for hooking the frame over the top 37 of the stationary portion K of the telescoping viewing hood of my stereoscopic fluoroscope. This top portion 37 over which the frame is hooked may be seen without the frame in Fig. 5.

A rack 4 is mounted for movement parallel to members 1 and 2 by means of two spur gears 5 and 6, with which the rack meshes, and also by means of two flanged rollers 7 and 8 which straddle the rack and are themselves rotatably mounted on stub shafts 9 and 10 carried by the main support 1. A second rack 11 is similarly disposed to mesh with two spur gears 12 and 13 so as to move rectilinearly between these gears and two flanged rollers or spools 14 and 15, which are mounted in the same manner as rollers 7 and 8. Gears 16 and 17 are rotatably supported on stub shafts carried by the main support 1.

Gear 5 is keyed to shaft 18 which is journaled at one end in support 1 and in bracket 19 mounted on plate 2 in any convenient manner. The outer end of shaft 18 carries a knob 20 for purposes later to be explained. Gear 13 is keyed to shaft 21 which is journaled at one end in support 1 and intermediate its two ends in bracket 22 mounted on plate 2. The external end of shaft 22 carries a knob 23, which will be later referred to.

A flat curved member 24 is attached to rack 4 by means of screw 26, and a somewhat similar flat and curved member 25 is attached to rack 11 by screws 27. These curved members, as well as the main support 1, should be made of X-ray transparent material, and they are adapted to move between the support 1 and the fluorescent screen 28. The lower ends of members 24 and 25 respectively carry metal pointers 29 and 30, these pointers and their supporting members 24 and 25 being so constructed and arranged that the ends of the pointers may be brought together at substantially the center of screen 28.

A scale 31 is mounted at right angles to member 25, but in the plane thereof, by screws or rivets 32, and an arm 33 is similarly mounted on member 24. The outer end of arm 33 carries a pointer 34 adapted to cooperate with scale 31.

To measure the distance of my object behind the screen by means of this apparatus, the operator places his head in the eye piece or head-positioning device 35 and then moves the entire assembly with respect to the object so that the two shadows thereof are substantially on a horizontal line with pointers 29 and 30. The operator then turns knob 23 which rotates gear 13 thus causing rectilinear movement of rack 11, which carries member 25 having pointer 30 mounted thereon. He turns knob 23 in the direction required by the position of the right-most shadow until the shadow of pointer 30 is in register with the said right-most shadow. He then similarly adjusts knob 20 until pointer 29 or its shadow is in registry with the left shadow of the object. The lateral movement of members 24 and 25 entails a corresponding relative movement of scale 31 and pointer 34, with the result that pointer 34 indicates a definite point on the scale for shadows of a given separation. It will readily be seen that scale 31 can be calibrated in advance in terms of the distance of the object behind the screen, this distance being expressed in centimeters or inches as desired. When such advance calibration has been made, the pointer 34 will always indicate the distance behind the screen of the object casting the shadows with which points 29 and 30, or their shadows, have been placed in registry.

If desired, this apparatus can be modified so that pointers 29 and 30 move near the front of the fluoroscopic screen, in which case these pointers themselves, rather than their shadows, must be aligned with the fluoroscopic shadows of the object whose depth is being determined. When the pointers are positioned in front of the screen, the portions of members 24 and 25 that overlap the screen must be made of material that is transparent to visual rays so that they will not obscure the fluoroscopic images.

Figure 7:
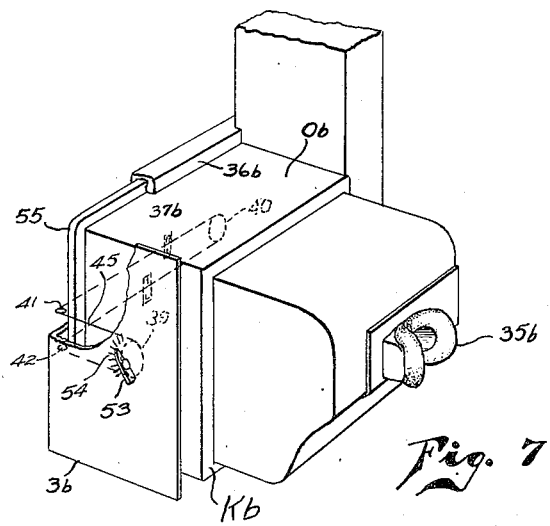
Fig. 7 is an isometric drawing of the viewing hood of my stereoscopic fluoroscope with the depth gauge of Figs. 8 and 9 mounted thereon.
Figure 8:
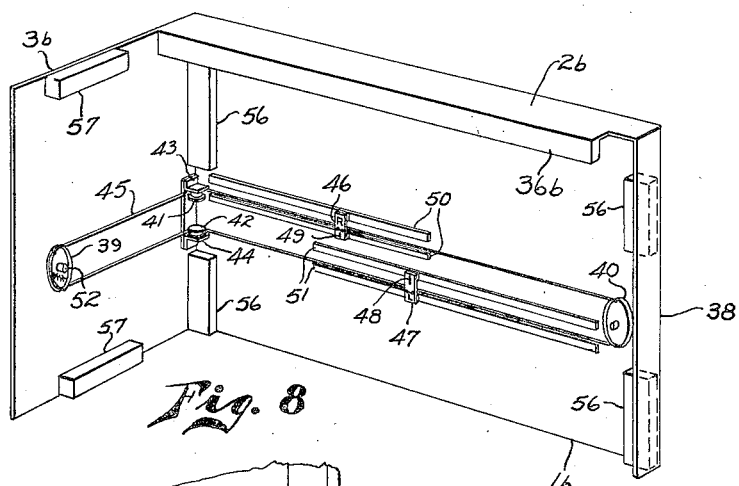
Fig. 8 is an internal view of one form of my depth measuring device.
Figure 9:
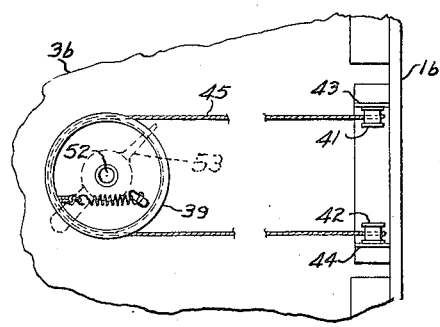
Fig. 9 is a fragmentary view looking from the right toward the left end of the mechanism of Fig. 9.

Figs. 7, 8 and 9 show another embodiment of my invention. In this species, the two movable devices that are to be aligned with the shadows may both be moved by a single control. The mechanism of this embodiment is mounted on a frame comprising a back panel 1b, a side panel 3b, a top panel 2b, a hooking strip 36b and a narrow side member 38.

A pulley 40 is rotatably mounted on a stub shaft carried on member 1b. A shaft 52 is journaled in panel 3b intermediate the ends of the shaft, and a pulley 39, having the same diameter as pulley 40, is keyed to this shaft on the inside of the panel. Two smaller pulleys 41 and 42 with aligned axes are pivotally mounted on brackets 43 and 44 attached to panel 3b or 1b near the corner where they are joined. A non-stretchable cord 45 passes around all these pulleys in the manner shown, and is attached to pulley 39 by means of a spring located between its flanges in a manner common in the radio art.

Two thin pieces of Bakelite or other X-ray transparent material are carried by this cord, a convenient means of attachment being to pass the cord through two holes in each piece. Piece 46 is mounted on the cord between pulleys 40 and 41, and piece 47 is carried on the cord between pulleys 40 and 42. An X-ray opaque wire 48 is mounted vertically on piece 47 near the top of the piece, and a similar wire 49 is attached to piece 46 near the bottom thereof. X-ray opaque letters R and L are affixed to pieces 46 and 47 respectively. These pieces are kept from rotating on the cord by the parallel X-ray transparent strips 50 and 51 cemented to panel 1b. Balsa wood is a very satisfactory material for these strips. Portions of piece 46 that lie on opposite sides of the cord are in sliding contact with strips 50, and strips 51 are in similar contact with piece 47.

On the outside panel 3b, a manually operable pointer 53 is rigidly attached to shaft 52, and this pointer cooperates with a scale 54, Fig. 7, attached to, or engraved on, the panel 3b.

To facilitate the attachment of this assembly to the viewing hood of the stereoscopic fluoroscope, I mount the fluoroscopic screen to the back of the box Kb by means of a moulding 55 which extends beyond the said box to form a flange therearound. The strip 36b slips over this flange as shown in Fig. 7. The blocks 56 serve to space panel 1b sufficiently far from the back of box Kb to permit the cord 45 and pieces 46 and 47 to move freely, and the narrow panel 38 and the blocks 57 on the opposite panel 3b prevent lateral movement of the assembly with respect to the box Kb and provide sufficient clearance for pulley 39 and the adjacent portions of cord 45.

To operate this depth finder, the viewing hood is first moved with respect to the subject being examined until the stereoscopic image of the part whose depth is to be determined appears to lie midway between the shadows of wires 48 and 49. Inasmuch as the eyes of the observer are looking through the image filtering or separating device described in preceding paragraphs as being a part of my stereoscopic fluoroscope, the right and left eyes will see only the images cast by the right and left X-ray sources respectively, and corresponding portions of these images will be positioned on the screen in the manner previously described. The operator then closes, say, his right eye and while looking with his left eye he rotates the manual knob 53 until the shadow of wire 48 just above the letter L is in line just above the part whose depth is to be determined. (For purposes of brevity, such part will hereinafter at times be referred to as the part that is to be localized, the depth-determining process being considered as localization.) The object of this letter L is to remind the operator that the adjoining wire is the one that is to be used when aligning with the left eye, the letter L thus meaning left. The rotation of this knob of course also moves the wire adjoining the letter R. The operator next closes his left eye and checks the alignment of the shadow of the R wire with the shadow that his right eye sees of the part being localized. If this wire does not line up properly just below the image of the part, the subject may need to be moved and the alignment rechecked with both eyes. When the alignment is correct, the indicator of the manual knob will indicate on the adjoining scale the correct distance of the part behind the screen. The scale, of course, must be correctly calibrated in advance, an operation that can be performed very simply by positioning a pin on a line perpendicular with the center of the screen and inscribing the scale to correspond with successive positions of the pointer as the pin is moved back one centimeter at a time.

The remaining figures illustrate my preferred mechanism for depth localization. A vertical support 58, Figs. 10 and 12, is attached at right angles to a base 59 by suitable means such as a bracket 60. A second vertical support 61, Figs. 12, 16 and 17, is also mounted on the base parallel to support 58. A shaft 62 is journaled in supports 58 and 61. On the free end of shaft 62 adjacent the bracket 58, the shaft carries a spring washer 63, then a flat washer or spacer 64, and lastly a lever 65 which is keyed or otherwise rigidly connected to the shaft. A second lever 67 is rotatably mounted on the reduced end of a post 68, the other end of which is pressed into, or otherwise attached to, support 58. A collar 69 prevents lever 67 from coming off the post. A pointer 70 is mounted at one end on a pivot carried by the movable end of lever 67, and it is also mounted intermediate its two ends on a pivot carried by the movable end of lever 65. The opposite end of pointer 70 extends through a slot 73 in the base 59. A manual indicator knob 71 is keyed to the end of shaft 62 that is adjacent bracket 61, and this indicator cooperates with a calibrated scale 72 attached to bracket 61. A collar 66 is adjustably mounted to shaft 62 intermediate the two supports in which the shaft is journaled, this collar being fixed in position against support 58 after the shaft has been adjusted longitudinally to prevent the pointer 70 from touching the edges of slot 73 and to produce sufficient tension on the spring washer 63 to frictionally maintain the rotating parts against unwanted movement. A cover 74 is attached to support 58 and base 59 to cover the linkage mechanism.

The assembly just described is mounted to the viewing box of the stereoscope in the manner shown in Figs. 10, 12, 15, 16 and 17. The pointer 70 extends through a slot 75 in the top of the stationary box K of the viewing hood, this slot being in register with slot 73 in the base of the assembly and with a corresponding slot in the decorative escutcheon 76 which is attached to the top of the box K. Thumb screws 77, Fig. 17, hold the depth-localizing mechanism in proper position on the viewing hood.

When the manual knob 71 is rotated, the end of pointer 70 moves through the viewing hood in a substantially straight line 80 perpendicular to the center of the fluoroscopic screen 79 mounted in the frame or moulding 55b at the back of the box O. This straight line motion is provided for in the design by proportioning the lengths of the levers and their arms so that the rise in the arc of the end of the pointer with respect to its top pivot is the same as the rise in the arc described by the pivot point at the end of lever 65 as it rotates about the center of shaft 62.

The front of the viewing hood is equipped with an eye positioning device similar to device 35b of Fig. 7. For the sake of simplicity, however, the eye piece has been omitted from Fig. 15, but it is disposed, of course, at the position indicated by the numeral 81 so that the eyes of the observer will be positioned in the same plane as the imaginary line 80.

The operation of this depth gauge is much simpler than that of the embodiments previously described, because its pointer moves right through the stereoscopic or spacial image, and it is merely necessary to manipulate the manual knob to bring the end of the pointer right to the stereoscopic image of the object that is to be localized. Before doing this, however, the viewing box must be so positioned with respect to the subject that the object whose depth is to be determined will be in line with the pointer, a position which automatically puts the object behind the center of the screen. The pointer may be moved to the spacial image of the object in only two or three seconds, and its correct distance behind the screen may then be read to a small fraction of a centimeter on the scale 72.

When this depth gauge is being used to localize a foreign object in the body of a patient, it is important to mark the skin directly over the object. This may be done by the marker and skin-to-screen measuring device of Col. A. A. de Lorimier, head of the Army School of Roentgenology. The only inventive concept here claimed in connection with this marker is in its correlation with the other elements of the depth gauge. A shaft 82, extending parallel to support 58 (see Fig. 17), is journaled in posts 83 and 84 attached to the base 59. An arm 85 is pinned near one end to shaft 82, and it carries a small cup 86 at its other end for receiving a wad 87 of felt, gauze or cotton that is moistened just before use with iodine, mercurochrome, ink or other suitable coloring. Cup 86 is located on arm 85 at such distance from the center of shaft 82, that the arc described by the center of the cup when arm 85 is rotated around the shaft will cross the line of movement 80 of the end of the pointer. The other end of shaft 82 carries a member 88 that extends radially from the shaft the same distance that the short end of arm 85 extends therefrom. Another member 89 identical to member 88 is pinned to shaft 82 intermediate posts 83 and 84, and a spring 93 surrounds shaft 82 between post 83 and member 89 for the purpose of urging member 89 against post 84. The free ends of members 88 and 89 and the short end of arm 85 are yoked together by means of a bar 90. Between members 89 and 88, this bar is calibrated preferably in centimeters in the manner indicated in Fig. 13 so that when the bar is placed against the back of the screen the indicator 91 will indicate the distance in centimeters from the screen to the end of the moistened wad 87.

The upwardly extending end of post 83, Fig. 14, supports an adjusting screw 92 in threaded engagement therewith, this screw being adjusted so that its head is in contact with bar 90 when the bar and the arm 85 are moved to an angular position in which the center of cup 86 is in line with the line of movement 80 of the end of the pointer 70.

After the distance from the screen to the foreign body has been determined by the depth gauge, the operator grasps member 88 and, while urging it counterclockwise to maintain contact between bar 90 and screw 92, he pushes it against the tension of spring 93 until the moistened wad 87 has marked the skin of the patient. While holding the shaft and associated parts in this longitudinal position, he then reads the skin-to-screen distance on the calibrated scale 94 on bar 90. When this distance is subtracted from the object-to-screen distance as determined by the depth gauge, the remainder is the object-to-skin distance. This distance may be marked directly on the patient, or on his chart, and the surgeon then knows that the foreign body is that distance below the mark.

When the marker is not in use, the arm 85 is rotated to a horizontal plane in which the spring 93 retracts it to a rest position above and against the top of the box K, as shown in broken lines in Fig. 17.

Figure 3:
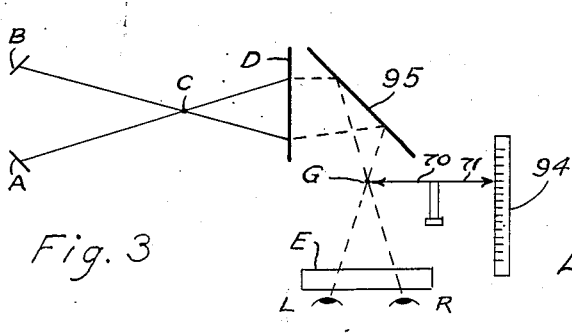
Fig. 3 is an optical diagram illustrating the displacement of stereoscopic images by means of a mirror and showing how such images may be used for determining the depth of an object behind the screen.

It is not essential for any of the embodiments herein described that the screen be disposed parallel to the plane of the observer's eyes. The rays from the screen D, Fig. 3, may be reflected towards the eyes by means of a mirror or prism 95, in which case either of the two devices first described will work equally well when disposed with respect to the screen in the manner already set forth.

Figure 2:
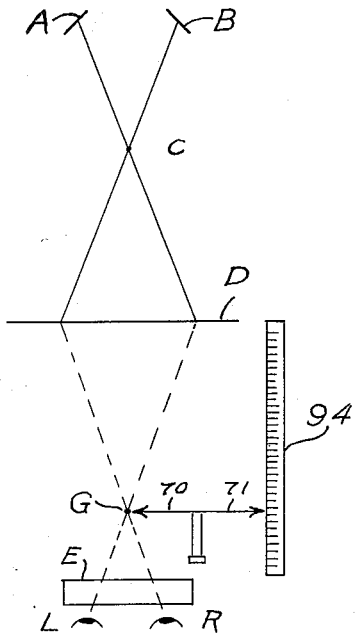
Fig. 2 is a diagram illustrating how the distance of objects behind the screen may be determined from the stereoscopic images.

The last described embodiment must be disposed so that the pointer will move through the stereoscopic or spacial image; and if the stereoscope is of such a type that the image does not form directly in front of an image-presenting surface, it is the position of the stereoscopic image that determines the field in which the pointer must move. When the image forms directly in front of the image-presenting surface as contemplated in the arrangements shown in Figs. 13, 15, 16 and 17, the situation is the same as that shown diagrammatically in Fig. 2, where the pointer, indicator and scale have been given the same reference numerals heretofore used. If a mirror or prism is optically interposed between the screen and the observer's eyes, as in Fig. 3, the stereoscopic image will form between the mirror or prism and the eyes, and the pointer 70 must therefore move through the field indicated in this figure.

Figure 4:
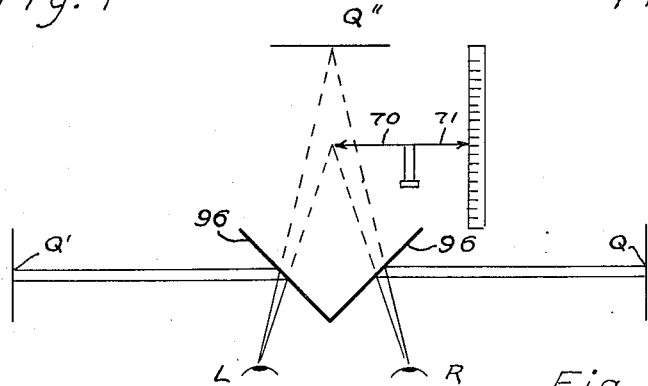
Fig. 4 is a diagrammatic illustration of the application of my invention to the conventional type of X-ray stereoscope.

In the conventional type of fluoroscope, used for viewing radiographs, the radiographs Q and Q' or other image-presenting surfaces are arranged on either side of mirrors 96, as represented in Fig. 4, and the stereoscopic image forms behind the mirrors, the surfaces Q and Q' being fused into a single image at Q''. If the mirrors 96 are of the semi-transparent variety, the last-described type of depth gauge may be positioned as shown in the figure, and the pointer 70 may be seen through the mirrors in the field where the virtual stereoscopic image appears.

It should be clear from the foregoing disclosures that my invention is of broad application, the three modifications shown and described being only representative embodiments. Many other embodiments may be made without departing from the spirit of the invention, and other equivalent instrumentalities may be substituted in the various combinations to perform the basic function of the parts shown and described without going beyond the scope of my invention as defined in the appended claims.

My claims are:

1. In a stereoscopic apparatus, means for measuring the position of actual objects by means of stereoscopic images of said objects, said means including: a rotatable shaft; an arm keyed to said shaft; a pointer pivoted to said arm at a point intermediate the pointer's ends; means constraining one end of said pointer to move in a definite path extending generally at right angles to said shaft; a calibrated scale; an indicator adapted to cooperate with said scale; and means for producing relative movement between said indicator and scale upon rotation of said shaft.

2. In a stereoscopic apparatus, means for measuring the position of actual objects by means of stereoscopic images of said objects, said means including: a rotatable member; manually operable means for rotating said member; a pointer pivoted to said member at a point intermediate the pointer's ends; means constraining one end of said pointer to move in a definite path extending generally at right angles to the axis of rotation of said rotatable member; a calibrated scale; an indicator adapted to cooperate with said scale; and means for producing relative movement between said indicator and scale upon movement of said pointer.

3. In a stereoscopic apparatus, means for measuring the position of actual objects by means of stereoscopic images of said objects, said means including: a rotatable control member; manually operable means for rotating said member; a pointer mounted for movement through the stereoscopic image; a linkage mechanism for moving one end of said pointer in a substantially straight line in response to the movement of said control; a calibrated scale; an indicator adapted to cooperate with said scale; and means for producing relative movement between said indicator and scale upon movement of said pointer.

LE ROY J. LEISHMAN.

REFERENCES CITED

The following references are of record in the file of this patent:

UNITED STATES PATENTS

| Number | Name | Date |
|---|---|---|
| 104,368 | Smith | June 14, 1870 |
| 870,506 | Gillet | Nov. 5, 1907 |
| 1,370,640 | Granger | Mar. 8, 1921 |
| 2,199,959 | Moriarty | May 7, 1940 |
| 2,207,867 | Loebell | July 16, 1940 |
| 2,282,114 | Brister | May 5, 1942 |
| 2,355,066 | Goldfield et al. | Aug. 8, 1944 |
| 2,441,538 | Steinhaus | May 11, 1948 |

FOREIGN PATENTS

| Number | Country | Date |
|---|---|---|
| 20,510 | Norway | Sept. 5, 1910 |